(12) United States Patent
Sismundo et al.

(10) Patent No.: US 11,003,973 B2
(45) Date of Patent: May 11, 2021

(54) NEAR FIELD COMMUNICATION DEVICE AND CORRESPONDING MANUFACTURING PROCESS

(71) Applicant: STMicroelectronics S.r.l., Agrate Brianza (IT)

(72) Inventors: Antonio Sismundo, Frattamaggiore (IT); Giuliano Filpi, Caserta (IT); Antonio Amoroso, Recale (IT); Raffaele Caiazzo, Casavatore (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 16/368,162

(22) Filed: Mar. 28, 2019

(65) Prior Publication Data

US 2019/0303736 A1    Oct. 3, 2019

(30) Foreign Application Priority Data

Mar. 28, 2018    (IT) ........................ 102018000004051

(51) Int. Cl.
| | |
|---|---|
| *G06K 7/08* | (2006.01) |
| *G06K 19/06* | (2006.01) |
| *G06K 19/07* | (2006.01) |
| *G06K 19/077* | (2006.01) |
| *H01Q 7/00* | (2006.01) |
| *H04B 5/00* | (2006.01) |
| *H01Q 1/00* | (2006.01) |
| *H04W 4/80* | (2018.01) |

(52) U.S. Cl.
CPC ... *G06K 19/0723* (2013.01); *G06K 19/07722* (2013.01); *H01Q 1/00* (2013.01); *H01Q 7/00* (2013.01); *H04B 5/0031* (2013.01); *H04W 4/80* (2018.02)

(58) Field of Classification Search
USPC ........................................ 235/451, 488, 492
See application file for complete search history.

(56) References Cited

U.S. PATENT DOCUMENTS

| | | | | |
|---|---|---|---|---|
| 3,664,244 | A * | 5/1972 | Painton | G03B 7/085 396/279 |
| 2007/0040683 | A1* | 2/2007 | Oliver | G06K 19/0716 340/572.1 |
| 2008/0061149 | A1* | 3/2008 | Tanner | G06K 19/07345 235/492 |
| 2008/0117049 | A1* | 5/2008 | Ogata | G06K 19/07722 340/572.1 |
| 2009/0206164 | A1* | 8/2009 | Kluge | B42D 25/00 235/492 |
| 2012/0248201 | A1* | 10/2012 | Sutera | G06K 19/07728 235/492 |

(Continued)

FOREIGN PATENT DOCUMENTS

CN    102663472 A    9/2012

*Primary Examiner* — Tuyen K Vo
(74) *Attorney, Agent, or Firm* — Slater Matsil, LLP

(57) ABSTRACT

A Near Field Communication (NFC) device, includes: a device support body comprising at least one antenna coil, an integrated circuit coupled to the at least one antenna coil; and a photoresistive circuit coupled to the at least one antenna coil and comprising a photo-resistance, the photoresistive circuit being configured to increase a resistance of the at least one antenna coil when the at least one photo-resistance is in its high resistance state in a dark condition.

20 Claims, 7 Drawing Sheets

(56) References Cited

U.S. PATENT DOCUMENTS

| | | | |
|---|---|---|---|
| 2015/0044966 A1 | 2/2015 | Shultz et al. | |
| 2015/0097037 A1* | 4/2015 | Narendra | G06K 19/07701 |
| | | | 235/488 |
| 2015/0097038 A1* | 4/2015 | Narendra | G06K 19/07345 |
| | | | 235/492 |
| 2015/0324683 A1* | 11/2015 | Linfield | G06K 19/07769 |
| | | | 235/492 |
| 2017/0109622 A1* | 4/2017 | Cepress | G06K 19/07737 |

* cited by examiner

NEAR FIELD COMMUNICATION DEVICE AND CORRESPONDING MANUFACTURING PROCESS

CROSS-REFERENCE TO RELATED APPLICATIONS

This application claims priority to Italian Patent Application No. 102018000004051, filed on Mar. 28, 2018, which application is hereby incorporated herein by reference.

TECHNICAL FIELD

Embodiments of the present disclosure relate generally to Near Field Communication (NFC) devices and a corresponding manufacturing process.

BACKGROUND

NFC (Near Field Communication) cards and tags devices usually include a microchip or integrated circuit and an antenna including one or more coils, usually obtained by depositing metal tracks on a plane of the card. A NFC card reader, or initiator, is configured, in order to activate the operation of the integrated circuit, to generate a time variable magnetic field (e.g. at 13.56 MHz), which induces a current in the coil or coils of the antenna. Such electromagnetically induced current is used for the power supply of the integrated circuit on the NFC device, which for instance performs the operation required and sends back through the same antenna the corresponding information to the reader.

Such cards are used for different application, like credit cards, electronic passports and other contactless applications, like access control and e-ticketing.

A problem with this type of cards is that everyone who comes in a sufficient proximity with the NFC device with a NFC reader, e.g. a smartphones routinely includes a NFC reader, can attempt a fraud using radiofrequency, i.e. attempt an unauthorized reading of the content of the NFC device with his NFC reader, scanning and copying its content, for instance the authentication content of a credit card or of a passport.

Thus, there is the need to offer a NFC device which is more secure and includes security and antifraud systems.

SUMMARY

The present disclosure provides solutions regarding a Near Field Communication device including a support body on which at least one antenna coil is arranged. At least an integrated circuit is arranged on the support body, and the integrated circuit is connected to the at least one antenna coil. The near field communication device includes a photoresistive circuit connected on the at least one antenna coil and including at least a photo-resistance, the photoresistive circuit being configured to increase the resistance of the at least one antenna coil when the at least one photo-resistance is in its high resistance state under dark conditions.

In variant embodiments, the support body includes a core sheet carrying the integrated circuit and at least one antenna coil which includes a hole or a recess in which the photo-resistance is mounted.

In variant embodiments, the support body includes a core sheet carrying the integrated circuit and at least one antenna coil, the core sheet being arranged between at least an upper and a lower sheet, the upper and/or lower sheet including a window in which the photo-resistance is mounted in the window.

In variant embodiments, the photo-resistance includes an upper and lower photosensitive surface.

In variant embodiments, the support body is substantially a planar body.

In variant embodiments, the support body includes also transparent sheets forming its upper and/or lower outer surface.

In variant embodiments, the core sheet has a passing hole and it is included between transparent sheets.

In variant embodiments, the photo-resistance is arranged in a cavity in the support body reaching a core sheet carrying the integrated circuit and at least one antenna coil.

In variant embodiments, the photo-resistance is arranged on an outer surface of the support body.

In variant embodiments, one or more of the sheets are plastic sheets or paper sheets.

The present disclosure provides also solutions regarding a process for manufacturing a Near Field Communication device as described above, including providing a core sheet carrying at least the integrated circuit and at least one antenna coil, arranging the core sheet within a stack of plastic or paper layers to form the card support body laminating the sheet stack to obtain the support body, the method also including arranging a photo-resistance electrically connected to the at least one coil and with at least a photosensitive surface facing outwards from an external surface of the card body.

In variant embodiments, the process may include providing at least a core sheet and an at least an upper and lower cover sheet, making a window in a vertically corresponding position at least in one of the at least an upper and lower cover sheet and in the core sheet, arranging the photo-resistance in the window in the core sheet, stacking at least the core sheet between the upper and lower cover sheet to obtain a sheet stack laminating the sheet stack to obtain the support body.

In variant embodiments, the process may include providing at least a core sheet, making a window in the core sheet, arranging the photo-resistance in the window in the core sheet, the photo-resistance including an upper and lower photosensitive surface.

Stacking at least the core sheet in a stack including a transparent upper and lower overlay sheet to obtain a sheet stack, laminating the sheet stack to obtain the support body.

In variant embodiments, the process may include stacking at least the core sheet in a stack, including providing also an upper and lower cover sheet between the transparent upper and lower overlay sheet, making a window in a vertically corresponding position to the window in the core sheet at least in the upper and lower cover sheet.

In variant embodiments, the process may include providing at least a core sheet, stacking at least the core sheet between further layers laminating the sheet stack to obtain the support body, making a cavity in the card support body reaching the core sheet, in particular by a standard milling and embedding process, and arranging the photo-resistance in the cavity on the core sheet electrically connected to the at least one coil, in particular by physical soldering or using conductive glue.

In variant embodiments, the process may include providing a card support body including a core sheet arranging the photo-resistance on an external surface of the support body connected to the at least one coil, in particular by physical soldering or using conductive glue.

In variant embodiments, the process may include that the thickness of the cover sheet or of both the cover sheets summed to the thickness of the core sheet is equal to the thickness of the photo-resistance.

In variant embodiments, the process may include placing on the outer surfaces of the stack a scratch resistant transparent overlay sheet.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

Figure 1:
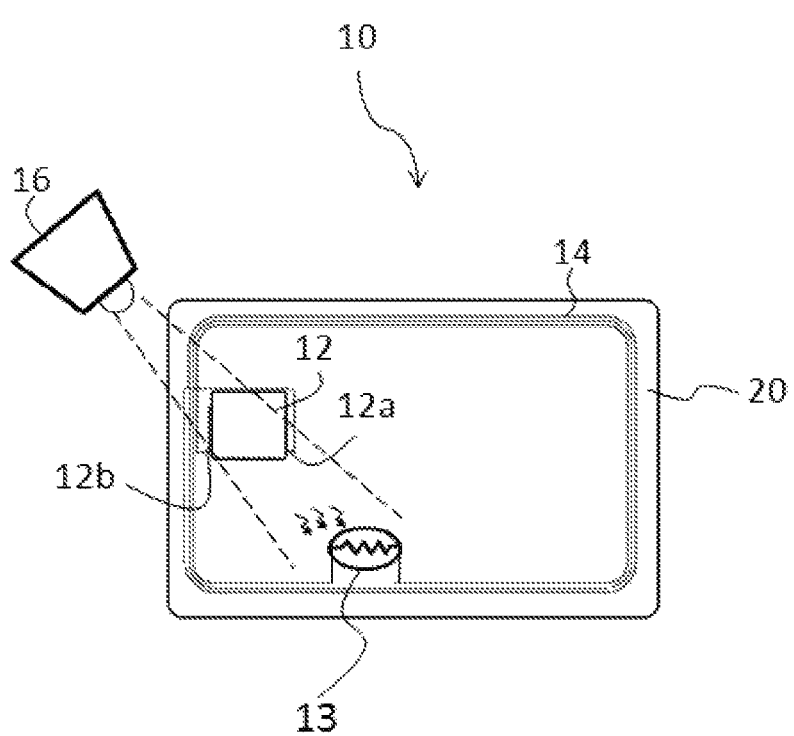
FIG. 1 shows schematically a Near Field Communication device, in accordance with an embodiment.

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures parts, elements or components which have already been described with reference to FIGS. 1 to 7 are denoted by the same references previously used in such Figures; the description of such previously described elements will not be repeated in the following in order not to overburden the present detailed description.

Embodiments of the present disclosure relate to solutions of NFC devices including a support body on which at least one antenna coil is arranged, on the support body being also arranged at least an integrated circuit connected to the at least one antenna coil.

Embodiments of the present disclosure relate in particular to NFC devices like NFC plastic cards or tags and also to NFC devices including a body made at least in part of paper, like electronic passports, e-tickets.

The solution here described in particular regards a near field communication device which includes a photoresistive circuit arranged connected on the at least one antenna coil and including at least a photo-resistance, the photoresistive circuit being configured to increase the resistance of the at least one antenna coil when the at least one photo-resistance is under dark conditions.

The value of the resistance increase, in particular of the photo-resistance, is calculated so that when a NFC reader sends an alternate magnetic field, the current generated in the coil 14 in dark conditions, i.e. a dark current, is under a current threshold sufficient to activate the integrated circuit.

In this way, when the NFC device is in dark conditions it is disabled, i.e., its integrated circuit is not operating and an unauthorized access to the NFC device cannot succeed. Dark conditions are defined by an amount of light level coming from the sun or from an illumination source below a certain threshold that put the photo-resistance, in a high resistance state, as opposed to a low resistance state when it is illuminated by light of an amount above a certain threshold.

Since while not in use, most NFC device, like credit cards or e-ticket kept in wallet and folded electronic passports, are in dark conditions, their NFC device cannot be read until a positive action of exposing to the solar or ambient light is performed by the user.

FIG. 1 shows a NFC device 10, in particular in form of a NFC card, which operates as antifraud system according to the solution here described, indicated as a whole with the numerical reference 10. Such card 10 includes a plastic body 20, having a rectangular shape, which carries an integrated circuit 12, for instance the integrated circuit of a UICC card. Terminals 12a and 12b of the integrated circuit 12 are coupled to an antenna 14 obtained by a metal coil, in particular a track running along the periphery of the plastic body 20. The metal track of the antenna 14 starts from the terminal 12a of the integrated circuit 12 and ends in the terminal 12b of the circuit 12, after performing several turns of the periphery of the body 20, for example three turns, so that, with the exception of where the tracks enter the terminals 12a, 12b, the antenna 14 defines three parallel metal coils co-planar with the plane of the body 20. The coils can be of course in a different number, depending on the parameters of the antenna 12. As known to the person skilled in the art, when a varying magnetic field is generated by a reader, a current is generated in the coil of the antenna 14, this current can carry power supply to the integrated circuit 12 for operation.

The NFC device 10 includes also a photoresistive circuit, which is a coupled on one of the coils of the antenna 14 and including a photo-resistance 13. The photoresistive circuit is configured to increase the resistance of the at least one antenna coil when the photo-resistance 13 is under dark conditions and thus is in its high resistance state. To this purpose, in the example, the photo-resistance 13 is arranged in series on the coil of the antenna 14. When in dark conditions, i.e. the photo-resistance 13 is not reached by the light of a radiation source 16, which can be the sun or ambient lighting, the photo-resistance 13 has high value and increases the total resistance of the antenna 14, decreasing the value of the current generated under an operation threshold of the integrated circuit 12. When exposed to the light, the photo-resistance 13 has a lower value of resistance, increasing the value of the current generated over the operation threshold of the integrated circuit 12, which can in this way operate normally and can be read by the external reader.

Thus, the photo-resistance 13 disables the electronic circuit 12 when it is not exposed to a light source, i.e. in dark conditions, and assures that no one is able to scan sensitive data.

Figure 2:
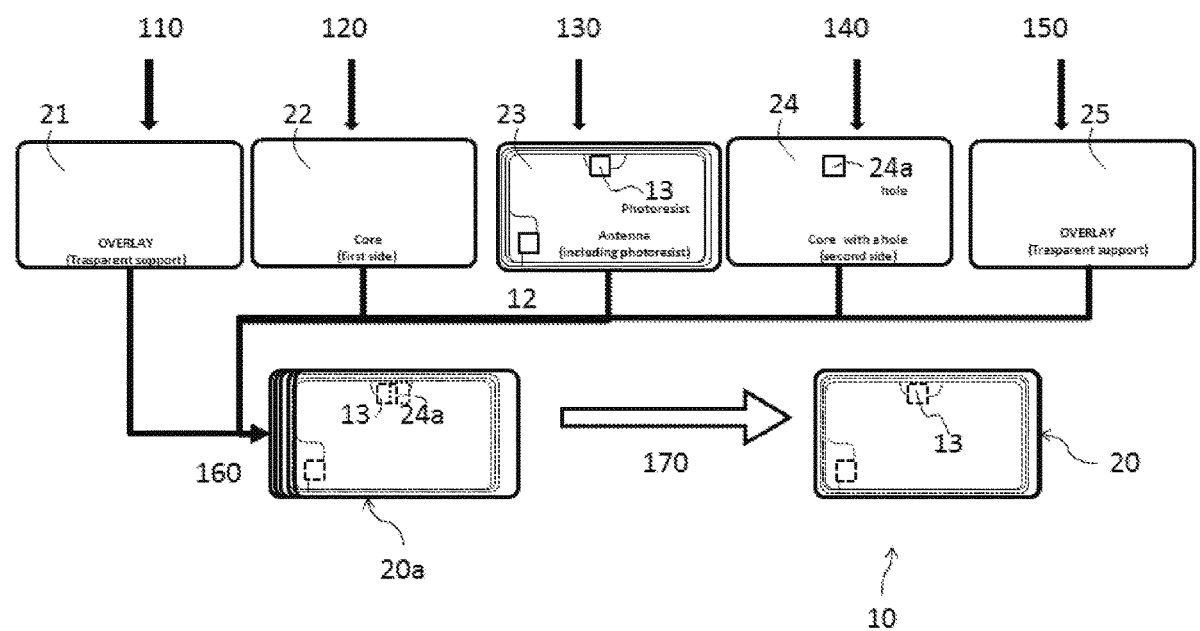
FIG. 2 shows schematically in plan view components and operation of an embodiment of a manufacturing process of the Near Field Communication device, in accordance with an embodiment.

FIG. 2 shows a manufacturing process of the card 10, which adds a photo-resist 13 in series with the antenna 14 inside a plastic or paper body, like the one used in credit cards, badge, e-ticket, holder page of a passport.

In FIG. 2 it is shown a first schematic representation of the manufacturing process. The process includes providing (in step no) a first transparent plastic overlay sheet 21. The first overlay sheet 21 is a plastic transparent layer (PVC, PC, PET or other no conductive material) which operates as support of the structure determining the plastic body 20. The process further includes providing (in step 120) a first cover sheet 22 which is a preferably opaque plastic sheet, representing the rear side of the card 10. Then the process includes providing (in step 130) a core layer 23, i.e. a layer, preferably a plastic layer, carrying the circuit components, i.e. the integrated circuit 12 connected to the coils of the antenna 14, and, in the example shown, the photo-resistance 13 connected in series on one of the coils for instance the most inner coil of the antenna 14. The processes for connecting such components on a plastic substrate are well known to the technicians in the field of Card and e-Passport Manufacturing. Then the process includes providing (in step 140) a second cover sheet layer 24 carrying a window 24a, i.e. a hole punched or milled in the sheet 24, which, given a corresponding shape of the core sheet 23 and cover sheet 24, has substantially the same position and size of the photo-resistance 13. The second cover sheet layer 24 represents the front sheet of the card on which, for protection, a second transparent plastic sheet 25 is placed.

In a step 140 a second cover sheet layer 24 carrying a hole 24a having the same position and size of the photo-resistance 13 is provided on the circuit sheet 13. The second cover sheet layer 24 represents the front sheet of the card 10: Then the process includes providing (in step 150) a second transparent plastic sheet 2.5.

All plastic sheets 21-25 in the example are rectangular with the same dimensions. In variant embodiments other shapes of the sheets 21-125 and the antenna 14 may be possible compatibly with the efficiency of the antenna 14. In variant embodiments one or more of the sheets 21-25 can be paper or cardboard sheets.

Then in a coupling operation (in step 160) the sheets 21-25 are stacked one upon the other, in that order, i.e. on the first transparent layer 21 is placed the first cover sheet 22, then on the first cover sheet 22 is placed the core sheet 23, the on the cover sheet 23 is placed the second cover sheet 23, so that the window 24a frames and contains the photo-resistance 13, finally the second transparent layer 25 is placed on the second cover sheet 24, covering the window 24a with an antiscratch protection which however allows the light reaching the photo-resistance 13 within the window 24a. In FIG. 2, the sheets are shown slightly horizontally shifted for better appreciating the order of the stack, however they have same dimensions and are vertically aligned (see lateral view of FIG. 3), so that when they are assembled together form a single card with the same dimension.

To assemble together the stack of sheets 21-25, a lamination process is performed (in step 170) to obtain the plastic body 20 of the card 10.

Figure 3:
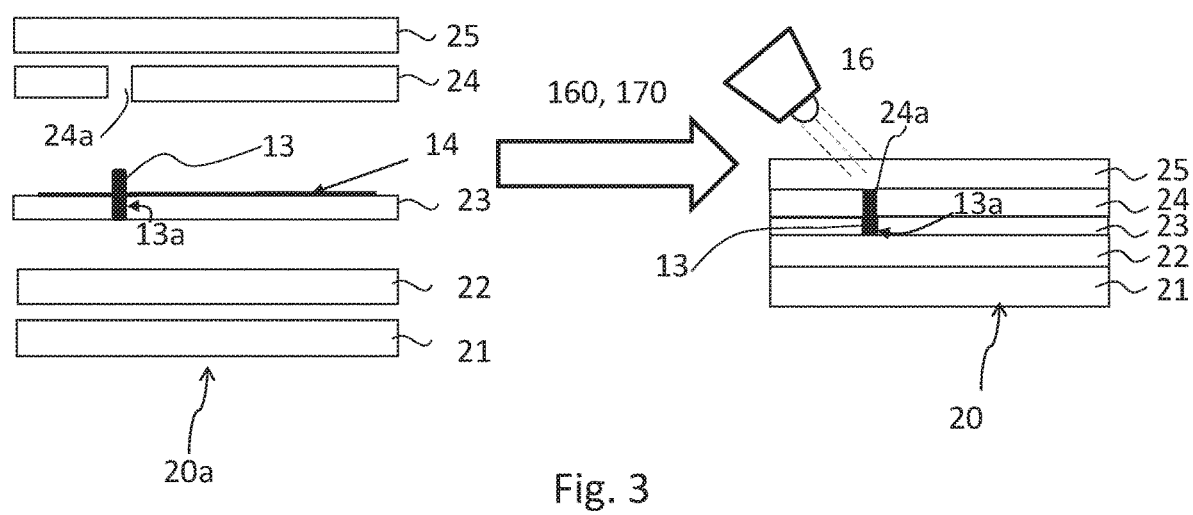
FIG. 3 shows schematically in lateral view components and operation of the embodiment of a manufacturing process of the Near Field Communication device, in accordance with an embodiment.

In FIG. 3 the stack of FIG. 2 is shown in a lateral view. As it can be seen the sheets are vertically aligned, and the photo-resistance 13 is positioned on the core sheet 23 so that is aligned with the window 24a. In particular at the position of the window 24a, a recess or, in the example shown, a window 13a obtained by a hole punched in the core sheet 23 is provided, so that the photo-resistance 13 is inserted within the window 13a. After the coupling (in step 160) and lamination, as shown in FIG. 3, the body 20 is obtained and the window 13a and 24a are aligned containing the photo-resistance 13, where thickness of the cover sheet 24 summed to the thickness of the core sheet 23 is equal to the thickness, i.e. the vertical dimension, of the photo-resistance 13. In variant embodiments also the lower core sheet 22 can have a corresponding window for the case the photo-resistance has two photosensitive surfaces, upper and lower.

Thus, with reference to FIGS. 2 and 3, in general the manufacturing process of the Near Field Communication device 10 includes basically providing the core sheet 23 carrying at least the integrated circuit 12 and at least one antenna coil 14, then arranging (in step 160) the core sheet 23 within a stack 20a of plastic or paper sheets to form the card support body, laminating (in step 170) the sheet stack 20a to obtain the support body 20, the process including also arranging at least a photo-resistance 13 coupled to one of the coils 14 and with at least a photosensitive surface facing outwards from an outer surface of the device support body 20.

Also in variant embodiments the process can include providing at least a core sheet 23 and a upper 22 and lower 24 cover sheet, the transparent sheets 21 and 25 being used as optional mechanical protection, making the passing window 24a in a vertically corresponding position at least in one of the upper and lower cover sheet 22, 24, and preferably a window 13a in the core sheet 23, arranging the photo-resistance 13 in the window 13a in the core sheet 23 if present or on the core sheet 23, stacking the core sheet 23 between the upper 22 and lower cover sheet 24 inserting the photo-resistance 13 in the window 24a in at least in one of the upper 22 and lower cover sheet to obtain the sheet stack 20a, in particular complete with sheets 21 and 25, laminating the sheet stack 20a to obtain the support body 20.

If both cover sheets 22, 24 are punched with a respective window for the photo-resistance 13, this photoresistance may have an upper and a lower photosensitive surface.

Figure 4:
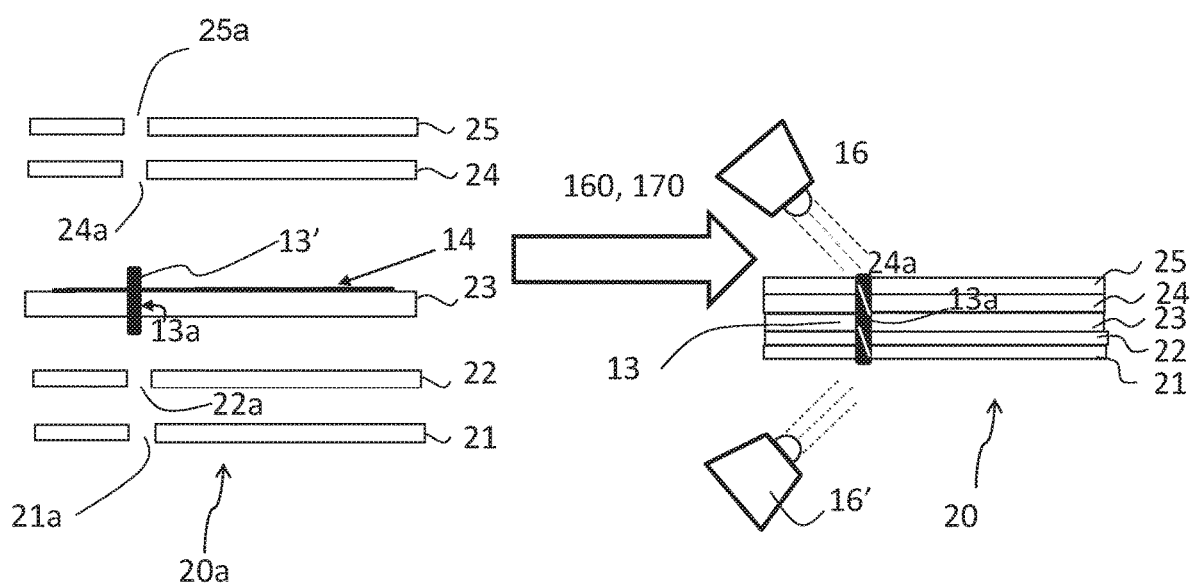
FIG. 4 shows schematically in lateral view components and operation of a second embodiment of a manufacturing process of the Near Field Communication device, in accordance with an embodiment.

In FIG. 4 it is shown a variant embodiment of the manufacturing process of FIG. 3, which includes providing punched transparent sheets 21, 25 as outer external sheets, and double photosensitive surface. In particular, a stack 30a includes the core sheet 23, positioned between the cover sheets 22, 24, which have a respective passing window 22a, 24a in correspondence of a photoresistance 13' arranged on the core sheet 23. The transparent sheets 21, 25 are placed as outer sheets under sheet 22 and over sheet 24 respectively, and are punched with passing windows 21a, 25a at the same position in the card plane of windows 22a, 24a. The photo-resistance 13' has an upper and a lower photosensitive surface, which can be reached from an upper light source 16 and lower light source 16'. As mentioned, the transparent overlay 21, 25 assures mechanical/functional performance, usually required for standard ID and financial applications, but does not assure an additional scratch resistance. In variant embodiments, the transparent sheets 21, 25 may not be punched, i.e. without windows 21a, 25a, for instance if the transparence of such sheets 21, 25 is such that it makes negligible the amount of illuminance subtracted from sheets 21,25 from the illuminance reaching the photoresistance 13 or 13'. In further variant embodiments the transparent sheets 21, 25 may be placed directly over the core sheet 23, with or without the windows 21a, 25a.

Thus in this variant embodiment it is provided stacking the core sheet 23 between a transparent upper and lower overlay sheet 21, 25 to obtain the sheet stack 30a.

Figure 5:
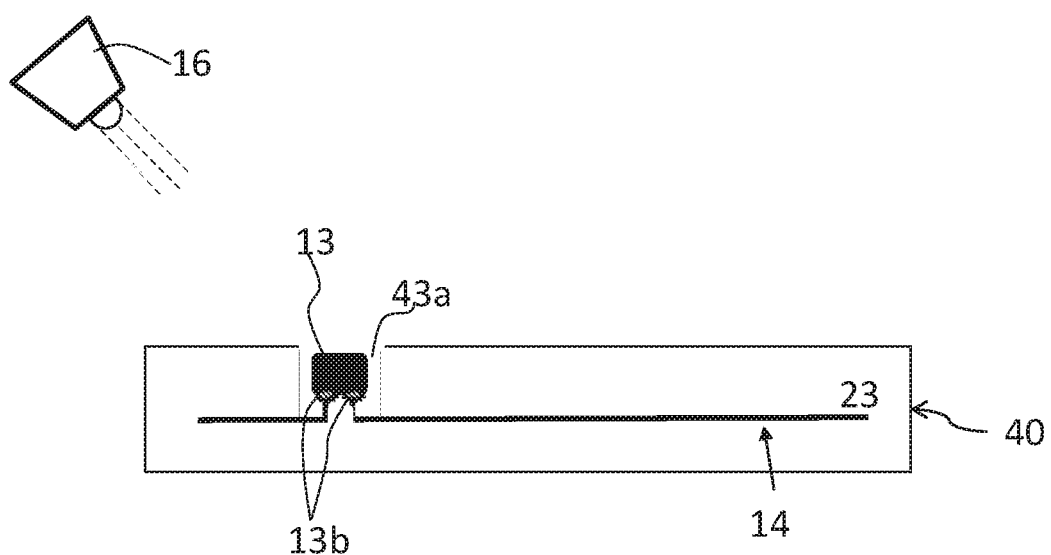
FIG. 5 shows schematically in lateral view components and operation of a third embodiment of a manufacturing process of the Near Field Communication device, in accordance with an embodiment.

As shown in FIG. 5, it is possible to use a standard milling and embedding process to make a cavity on the card body 20 to hold the photo-resistance 13. The connection with the antenna 14 it is possible trough connections 13b obtained physical soldering or using conductive glue. Thus in this case the process includes providing at least a core sheet 23, stacking at least the core sheet between further layers, which forms the stack 40, laminating the sheet stack 40a to obtain the support body 40, then making a cavity 43a in the card support body 40 reaching the core sheet 23, in particular by a standard milling and embedding process, and arranging the photo-resistance 13 in the cavity 43a on the core sheet 23 electrically connected, by connections 13b, to the coil of antenna 14, in particular by physical soldering or using conductive glue. Thus the variant embodiment of FIG. 5 describes a manufacturing process including providing (in step 120) at least a core sheet 23, stacking (in step 160) at least the core sheet 23 between further sheets, in particular the sheets 21, 22, 24, 25 like in FIG. 2, laminating (in step 170) the obtained sheet stack to obtain the support body 40, making a cavity 43a in the device support body 40 reaching the core sheet 23, in particular by a standard milling and embedding process, and arranging the photo-resistance 13 in the cavity 43a on the core sheet 23 electrically connected, by the connections 13b, to the at least one coil, in particular by physical soldering or using conductive glue.

Figure 6:
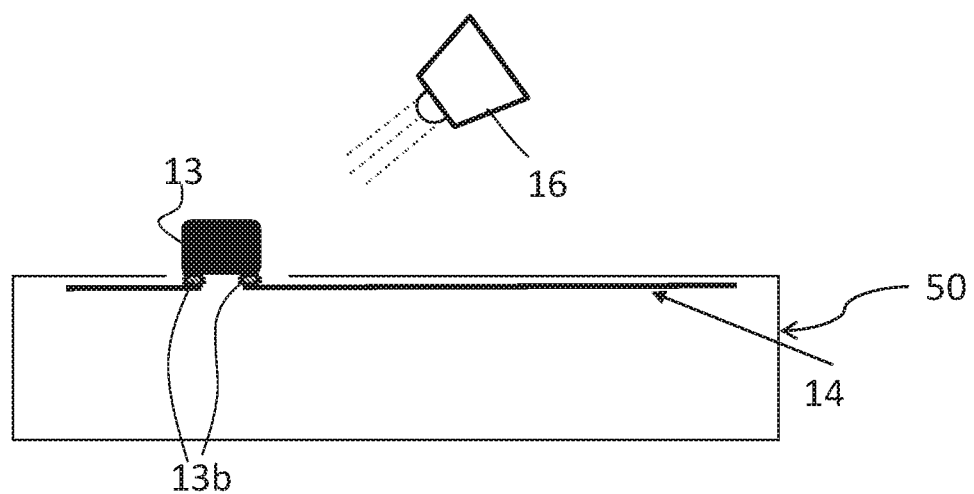
FIG. 6 shows schematically in lateral view components and operation of a fourth embodiment of a manufacturing process of the Near Field Communication device, in accordance with an embodiment.

Also as shown in FIG. 6 it is possible to lay the photo-resistance 13 on one of the external faces of the card, 10, i.e. of e a body 50. Connections 13b with the antenna 14 it is possible through physical soldering or using conductive glue. This variant of the process is in particular for structure not made with plastic materials, in particular body containing paper sheets, such as (e-ticket, passport with holder page in paper.

Thus in this the case the variant embodiment of the manufacturing process described with reference to FIG. 6 includes providing a device support body 50 including a core sheet 23, which is in particular arranged near the surface, arranging the photo-resistance 13 on an outer surface of the support body 50 connected to the at least one coil 14, in particular by physical soldering or using conductive glue, in particular via through-holes in the upper transparent sheet 25.

Figure 7:
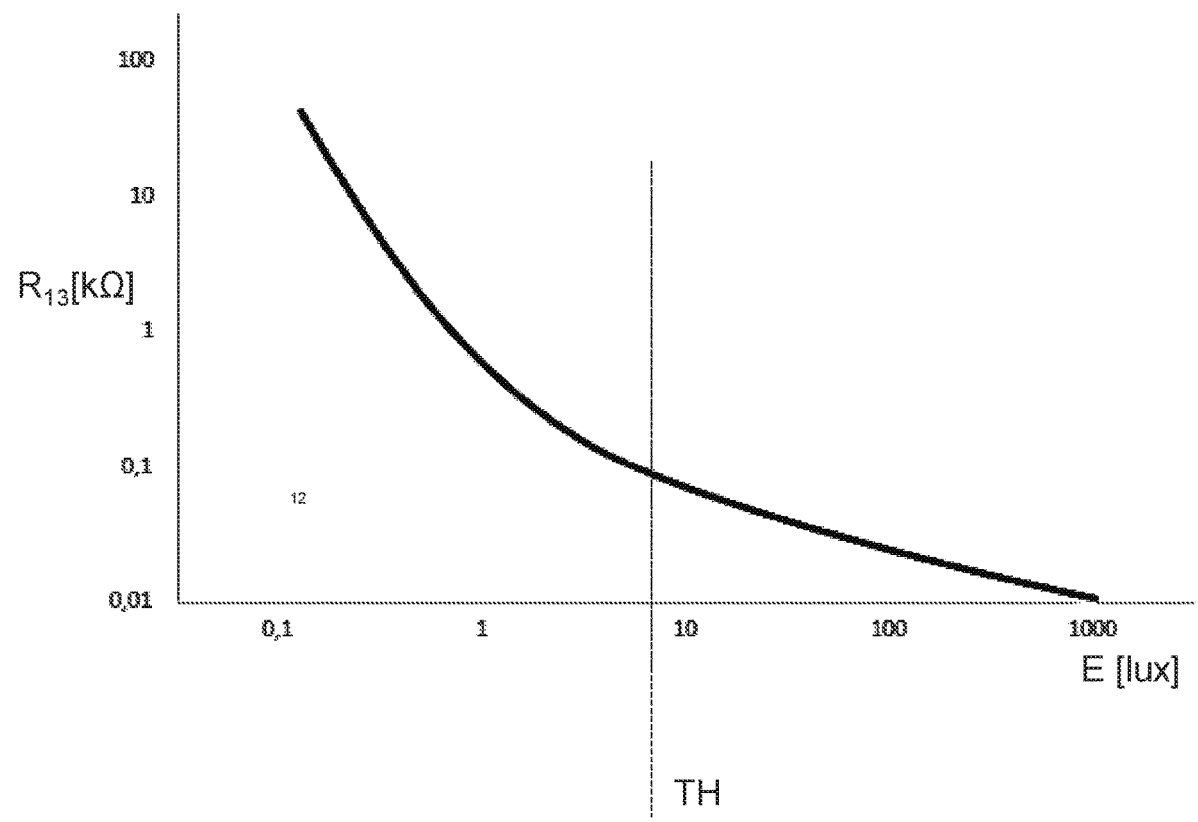
FIG. 7 shows a diagram representing a qualitative characteristic curve of a photoresistance which may be used in the Near Field Communication device, in accordance with an embodiment.

FIG. 7 shows a diagram representing the qualitative characteristic curve of the photoresistance 13, in particular a resistance $R_{13}$ of the photoresistance 13 as a function of the illuminance E. In FIG. 7 it is shown also an exemplary value of threshold TH of the illuminance E is shown, having a value around 8 lux, corresponding to a 100Ω resistance of the photoresist 13 which can correspond to dark conditions. Typical values of the supply current of a processor in the integrated circuit 12 are below 5 mA, therefore, the photo-resistance 13 should be sized so that at the illuminance threshold TH the value of resistance $R_{13}$ is that the current is below such limit of the supply current of the integrated circuit 12, in particular of its processor, e.g. is below 5 mA.

The described solution thus provides removing a drawback of contactless solutions using NFC devices, exploiting the fact that while not in use, most NFC device, are in dark conditions, i.e. not reached by the light, thus their NFC device cannot be read until a positive action of exposing to the solar or ambient light is performed by the user. This allows to reject many attempts to fraud, by unauthorizedly reading the NFC device when not in use.

Of course, without prejudice to the principle of the disclosure, the details of construction and the embodiments may vary widely with respect to what has been described and illustrated herein purely by way of example, without thereby departing from the scope of the present disclosure.

In variant embodiments, the photoresistive circuit may include more than one photo-resistance or other light sensitive component, and can be arranged differently with respect to the coil, provided that the circuital arrangement of such photoresistive circuit is configured to increase the resistance of the at least one antenna coil when the at least one photo-resistance is in its high resistance state in dark conditions.

As mentioned the Near Field Communication device can be an UICC card or smartcard, or another type of NFC tag. Although most NFC devices are card with a parallelepiped card shape, the Near Field Communication device can have a different structure, like a fob or a keyring, or other structures used for contactless application using NFC.

What is claimed is:

1. A Near Field Communication (NFC) device, comprising:
   a device support body comprising at least one antenna coil, an integrated circuit coupled to the at least one antenna coil, the at least one antenna coil having a first portion and a second portion, a first terminal of the first portion coupled to a first terminal of the integrated circuit, a first terminal of the second portion coupled to a second terminal of the integrated circuit; and
   a photoresistive circuit coupled in series between a second terminal of the first portion of the at least one antenna coil and a second terminal of the second portion of the at least one antenna coil, the photoresistive circuit comprising a photo-resistance, the photoresistive circuit being configured to increase a resistance of the at least one antenna coil when the photo-resistance is in its high resistance state in a dark condition.

2. The NFC device of claim 1, wherein the device support body comprises a core sheet carrying the integrated circuit and the at least one antenna coil, and wherein the core sheet comprises a recess in which the photo-resistance is mounted.

3. The NFC device of claim 2, wherein the device support body further comprises an upper sheet and a lower sheet, wherein the core sheet is arranged between the upper sheet and the lower sheet, and wherein at least one of the upper sheet or the lower sheet comprises a window in which the photo-resistance is mounted.

4. The NFC device of claim 1, wherein the photo-resistance comprises an upper and lower photosensitive surface.

5. The NFC device of claim 1, wherein the device support body is substantially a planar body.

6. The NFC device of claim 1, wherein the device support body comprises transparent sheets forming outer surfaces of the device support body.

7. The NFC device of claim 6, wherein the device support body comprises a core sheet having a passing hole, the core sheet being arranged between the transparent sheets.

8. The NFC device of claim 1, wherein the photo-resistance is arranged in a cavity in the device support body, and wherein a core sheet of the device support body carries the integrated circuit and the at least one antenna coil.

9. The NFC device of claim 1, wherein the photo-resistance is arranged on an outer surface of the device support body.

10. The NFC device of claim 1, wherein the device support body comprises one or more of sheets comprising plastic sheets or paper sheets.

11. A method of manufacturing a near field communication device, the method comprising:
providing a core sheet carrying an integrated circuit and at least one antenna coil, the at least one antenna coil having a first portion and a second portion, a first terminal of the first portion coupled to a first terminal of the integrated circuit, a first terminal of the second portion coupled to a second terminal of the integrated circuit;
arranging the core sheet within a stack of sheets to form a card support body;
laminating the card support body to obtain a device support body; and
arranging at least a photo-resistance electrically connected in series between a second terminal of the first portion of the at least one antenna coil and a second terminal of the second portion of the at least one antenna coil, and wherein at least a photosensitive surface of the photo-resistance is facing outwards from an outer surface of the device support body.

12. The method of claim 11, wherein the stack of sheets comprises plastic or paper sheets.

13. The method of claim 11, further comprising:
an upper cover sheet and a lower cover sheet;
forming a window in a vertically corresponding position in at least one of the upper cover sheet or the lower cover sheet;
forming a window in the core sheet;
arranging the photo-resistance in the window in the core sheet; and
stacking the core sheet between the upper cover sheet and the lower cover sheet, wherein stacking comprises inserting the photo-resistance in the window in at least one of the upper cover sheet or the lower cover sheet to obtain the card support body.

14. The method of claim 11, further comprising:
forming a window in the core sheet;
arranging the photo-resistance in the window in the core sheet, the photo-resistance comprising an upper photosensitive surface and a lower photosensitive surface; and
stacking the core sheet in a stack comprising transparent upper and lower overlay sheets to obtain a sheet stack; and
laminating the sheet stack to obtain the device support body.

15. The method of claim 14, wherein stacking the core sheet in a stack comprises providing an upper cover sheet and a lower cover sheet between the transparent upper and lower overlay sheets and forming a window in a vertically corresponding position to the window in the core sheet at least in the upper cover sheet and the lower cover sheet.

16. The method of claim 11, further comprising:
stacking the core sheet between further sheets to form a sheet stack;
laminating the sheet stack to obtain the device support body;
forming, by a milling and embedding process, a cavity in the device support body reaching the core sheet; and
arranging the photo-resistance in the cavity in the core sheet and electrically connecting, by physical soldering or using conductive glue, the photo-resistance to the at least one antenna coil.

17. The method of claim 11, further comprising arranging the photo-resistance on an outer surface of the device support body and connecting, by physical soldering or conductive glue, the at least one antenna coil to the photo-resistance.

18. The method of claim 11, wherein a thickness of the card support body is equal to a thickness of the photo-resistance.

19. The method of claim ii, further comprising placing a scratch resistant transparent overlay sheet on outer surfaces of the stack of sheets.

20. A device comprising:
an integrated circuit;
an antenna, the antenna having a first portion and a second portion, a first terminal of the first portion coupled to a first terminal of the integrated circuit, a first terminal of the second portion coupled to a second terminal of the integrated circuit;
a variable resistor coupled in series between a second terminal of the first portion of the antenna and a second terminal of the second portion of the antenna; and
a photoresistive circuit coupled to the variable resistor, the photoresistive circuit configured to increase a resistance of the variable resistor above a threshold in response to the device being in a dark condition, and, based thereon, disable communication at the antenna.

* * * * *

UNITED STATES PATENT AND TRADEMARK OFFICE
CERTIFICATE OF CORRECTION

PATENT NO.         : 11,003,973 B2
APPLICATION NO.    : 16/368162
DATED              : May 11, 2021
INVENTOR(S)        : Antonio Sismundo It is certified that error appears in the above-identified patent and that said Letters Patent is hereby corrected as shown below:

In the Claims

In Claim 19, Column 10; Line 34 delete "claim ii" insert --claim 11--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*